July 21, 1936.    B. JOHNSEN    2,048,387
SAFETY DEVICE
Filed March 5, 1932    4 Sheets-Sheet 1
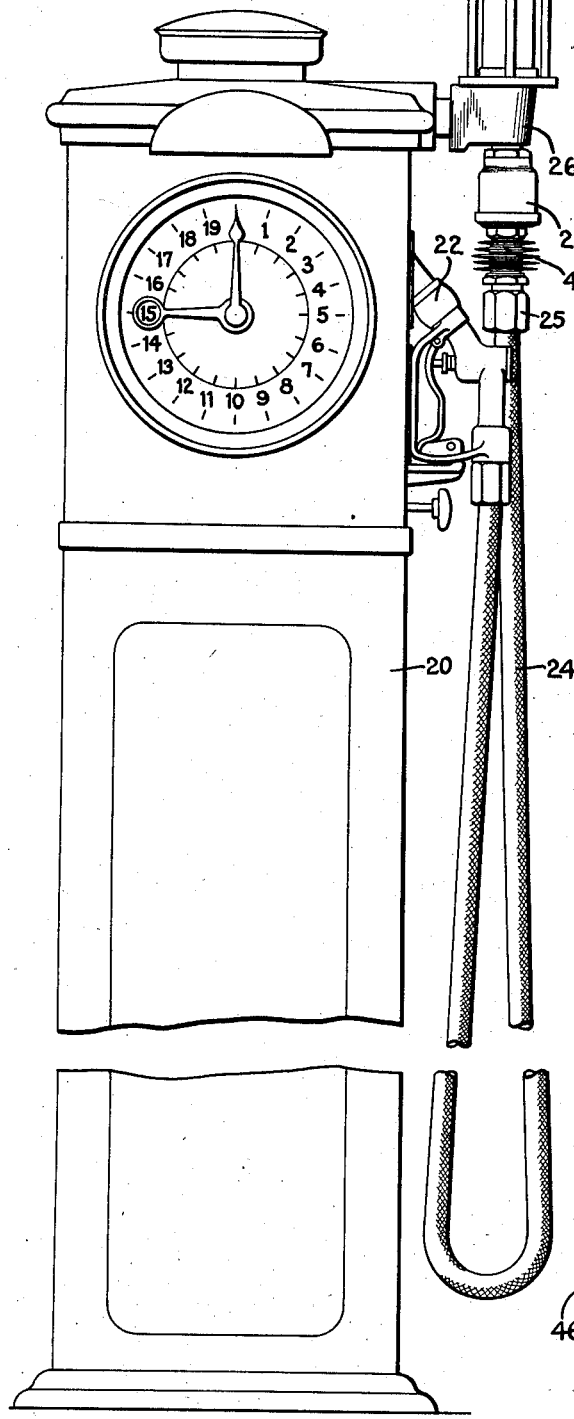
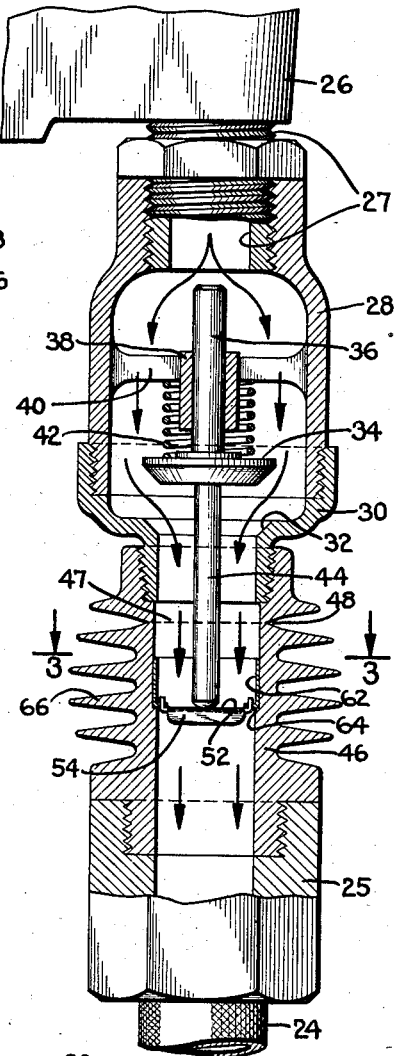
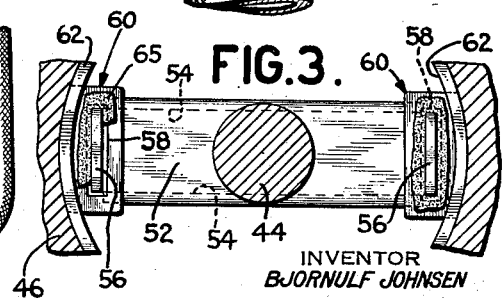
INVENTOR
BJORNULF JOHNSEN
BY
Bohleber & Ledbetter
HIS ATTORNEYS

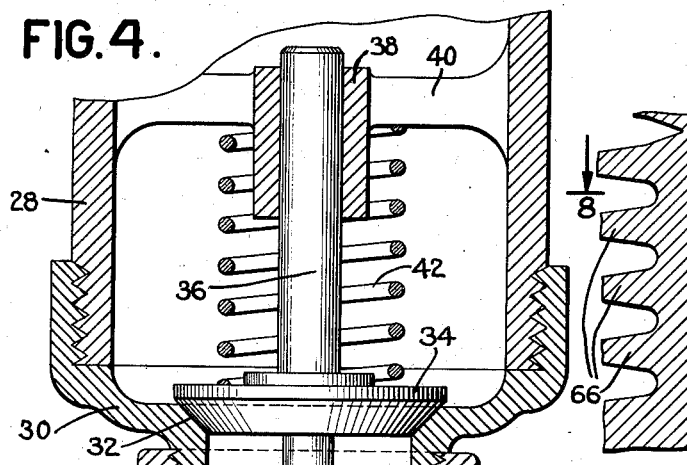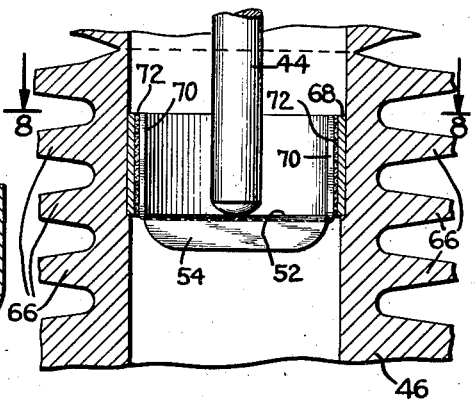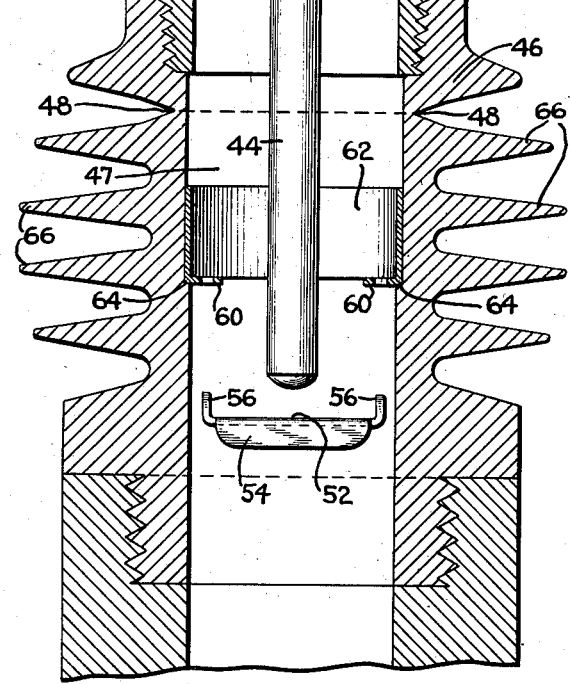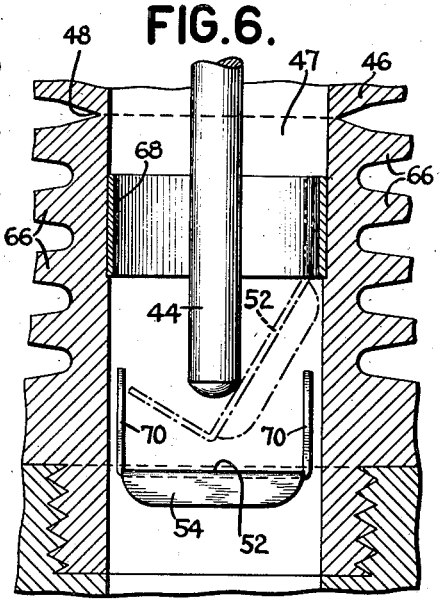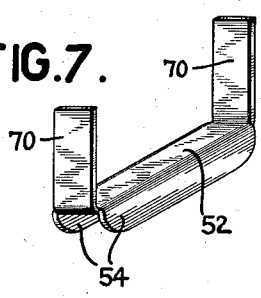

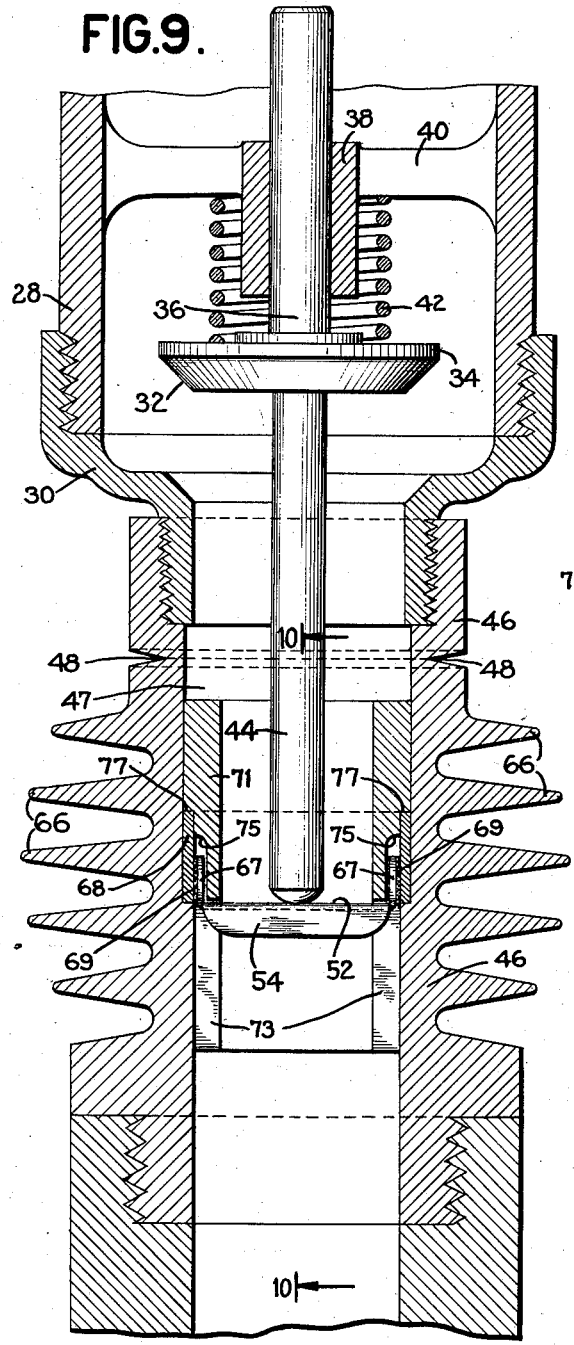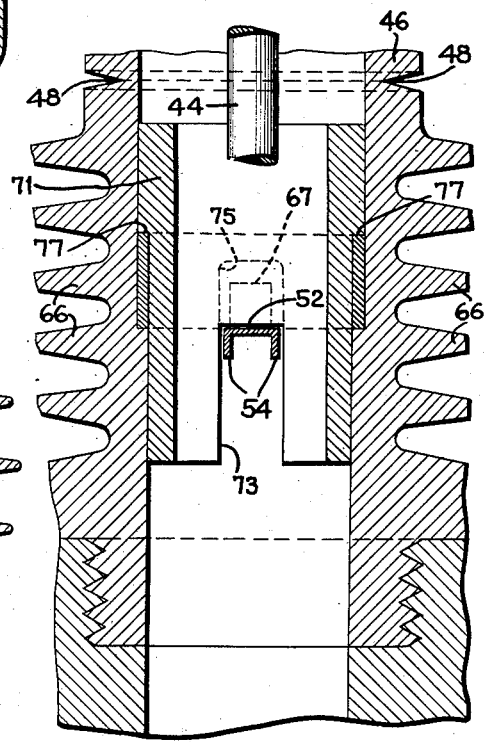

July 21, 1936.  B. JOHNSEN  2,048,387
SAFETY DEVICE
Filed March 5, 1932  4 Sheets-Sheet 4
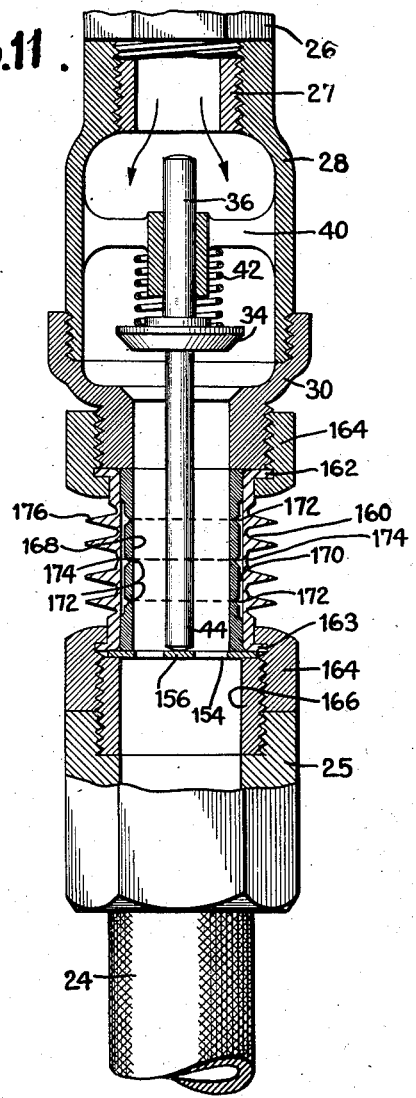
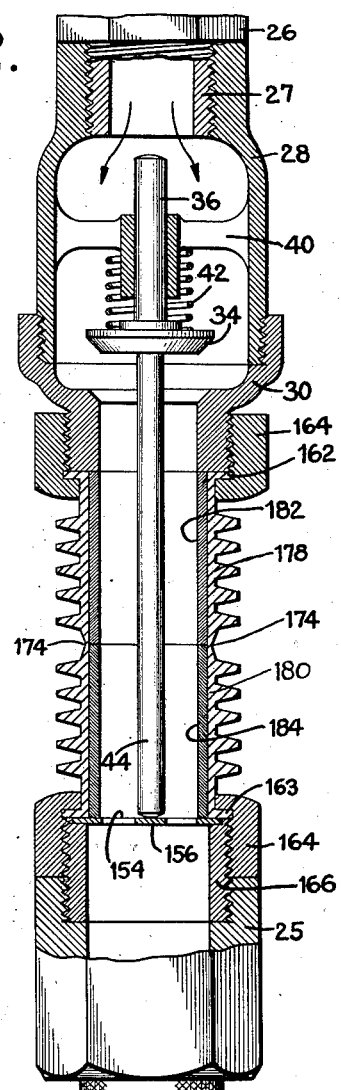
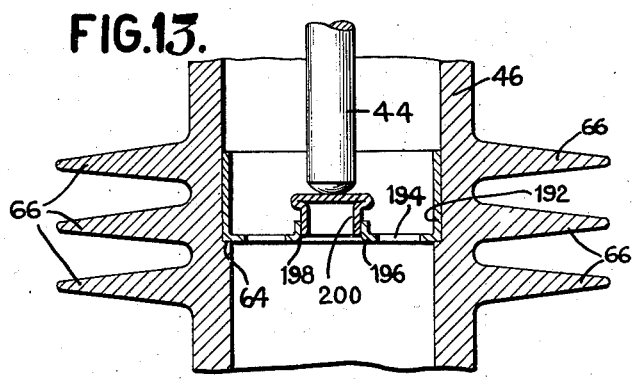
INVENTOR-
BJORNULF JOHNSEN
BY
Bohleber & Ledbetter
HIS ATTORNEYS Patented July 21, 1936

2,048,387

UNITED STATES PATENT OFFICE 2,048,387

SAFETY DEVICE

Bjornulf Johnsen, Brooklyn, N. Y., assignor to Harry T. Goss and Bjornulf Johnsen, copartners trading under the firm name and style of Goss & Johnsen, New York, N. Y.

Application March 5, 1932, Serial No. 597,081

22 Claims. (Cl. 137—162)

This invention relates broadly to the control of fluid, either liquid or gaseous, flowing through a conduit. More particularly, the invention relates to the stopping of the flow of fluid automatically upon the occurrence of a certain event such as, for instance, a break in the conduit, or a change in the temperature, beyond a predetermined range, in proximity thereto.

In one of its aspects, the invention relates to a valve controlling the flow of an inflammable liquid, such as gasoline, delivered, say, through a hose to a vehicle tank from a fluid dispensing device adapted to dispense gasoline and other liquid fuels at roadside service stations and the like, of the kind in which the pump is automatically actuated, as by a motor. In such fluid dispensing devices heretofore known, the operator, upon removing the nozzle from its support, starts the motor, for instance, by closing the circuit, manually or otherwise, and then moves to the vehicle tank where he can see exactly how much the tank will hold and serve it without spilling.

If, while the fluid is being delivered, the vehicle should unexpectedly move off with the nozzle still inserted in the fuel tank, the hose may either be torn or broken or such a strain placed upon the fluid delivery device as to damage materially some or all of the parts thereof and, if a break occurred, inflammable fluid would flow out into the surrounding area and create a fire hazard. Similarly, if a fire should break out when fluid is being delivered, the flames of the burning fluid enveloping the hose or the heat therefrom might be sufficient to prevent the operator from returning to the dispensing device to shut off the motor with the result that the pump would continue to deliver inflammable fluid and feed the fire, thus rendering possible a conflagration of great extent and also increasing materially the fire hazard. When it is considered that under ground storage tanks for gasoline sometimes have a capacity of one thousand gallons, which is delivered by the service pump at the rate of 12 or 15 gallons per minute, it will be readily appreciated that the fire hazard in connection with such fluid dispensing devices is a great one.

One object of the invention is, therefore, to provide that, when a force is exerted on a hose or pipe, a fracture will occur at a predetermined point, which fracture shall automatically result in the closing of the conduit to the flow of fluid. Accordingly, the wall of the conduit is weakened at at least one predetermined point, and provision is made to instantaneously release a valve and permit it to close the conduit.

In another of its aspects, the invention is applicable as a safety valve in a pipe line conducting illuminating gas, say, into or throughout a building, as at the meter in the service line from the gas main in the street. Or such a safety valve may be disposed on each floor or in each branch pipe line in a building. In any event, should damage to the line occur or a fire break out, the valve will automatically close the conduit.

The invention is equally applicable to the conduit conducting fuel oil to burners, say, on shipboard or in buildings, for the same purpose.

Another object of the present invention is to provide a device which is responsive to a predetermined temperature to close a conduit for fluid of any character. Accordingly, a valve is placed in the conduit, as between the hose and an outlet from a fluid dispensing device, which valve has a tendency to close but is retained in open position by a device operative to hold the valve open, but rendered inoperative at a predetermined temperature to permit the valve to close. More particularly, the means which holds the valve in its open position against, say, the action of a spring tending to close the same may be, at least in part, of a material fusible at a predetermined temperature.

The invention also has for its object the disposition, within the conduit, of the temperature responsive element which holds the valve in open position.

It is also an object of the invention to provide for the rapid transfer of heat from the exterior of the fluid passage to the interior and to the element responsive to the predetermined temperature.

Still another object of the invention is a heat responsive element associated with the walls of the conduit, through which walls the heat will be transferred thereto.

Yet another object is to prevent the dissipation of the heat conducted through the walls of the fluid flowing therewithin. To this end, the fluid may be separated or isolated from the heat transferring wall, conveniently, by a wall either nonconductive to heat or refractory.

It is a further object of the invention to incorporate the valve and its associated controlling means in a self-contained unit adapted to be interposed in a fluid conduit at a desired point.

The invention further seeks, for the control of a member movable for any purpose whatsoever, an element responsive to a given set of conditions as, for instance, a force applied thereto or a temperature change, which responsive element, may, if desired, be replaceable.

The invention also seeks a device of the character described, which is practical from the standpoint of ease and cheapness of manufacture and convenience and reliability in installation and use.

These and other objects of the invention and the means for their attainment will be more apparent from the following detailed description taken in connection with the accompanying drawings illustrating various embodiments by which the invention may be realized, and in which:—

Figure 1 is a view, in front elevation, of a fluid dispensing device to which the invention is applied;

Figure 2 is a view showing, on an enlarged scale, a controlling device for a fluid passage, in longitudinal section and partly in elevation;

Figure 3 is a transverse sectional view, on a still further enlarged scale, of the temperature responsive device illustrated in Figure 2 and taken in the plane indicated by the line 3—3 of Figure 2 and looking in the direction of the arrows.

Figure 4 is a view similar to Figure 2, but on an enlarged scale, showing the temperature responsive device of Figure 2 after having responded to the raising of its temperature to a predetermined point whereby the conduit is closed to the passage of fluid;

Figure 5 is a fragmentary view, in longitudinal section, showing a modified form of temperature responsive device in position holding the valve or other movable element in its inactive position;

Figure 6 is a view similar to Figure 5, but showing the device after it has responded to a change in temperature, thereby releasing the movable element for movement;

Figure 7 is a perspective view of a bridge member adapted to hold a valve stem in open position, which member may be secured within the confines of the conduit;

Figure 8 is a transverse sectional view, taken in the plane indicated by the line 8—8 of Figure 5, and looking in the direction of the arrows;

Figure 9 is a view substantially similar to Figures 2 and 4 in which the heat responsive device is insulated from the fluid flowing through the conduit;

Figure 10 is a view in transverse section taken on the line 10—10 of Figure 9;

Figure 11 is a view showing still another modification of the invention in longitudinal section, which may also be inserted in any pipe line or conduit;

Figure 12 shows still another modification of the invention in longitudinal section; and Figure 13 is a fragmentary view, in longitudinal section, showing still another modification of a temperature responsive element controlling a movable element.

While the invention has been illustrated as applied to a fluid dispensing device having a hose for delivery of fluid, it will be apparent, as the description proceeds, that the invention is not limited in its application to liquid dispensing devices having hoses for the delivery of liquid but that it is equally applicable in any situation in which the flow of any fluid, either liquid or gaseous, is to be controlled dependent upon the happening of an event, as a rupture in the conduit or associated or contiguous parts or a rise in temperature.

In the application of the invention illustrated in Figure 1, a standard or housing 20 of any convenient shape is adapted to support and contain the devices for establishing the flow of fluid from a source, such as a tank (not shown), say, beneath the ground and measuring it for delivery from a nozzle 22 on the end of a hose 24 into, say, the fuel tank of a motor vehicle. The hose 24 is shown as leading from an outlet fitting 26 of any convenient kind.

It is proposed, in accordance with this invention, to provide a device, indicated generally at 28, 46, in Figure 1, between the end of the hose 24 and the fitting 26, which shall control the flow of fluid through the hose and interrupt its flow under certain conditions such as when there is a pull on the hose of such magnitude as to rupture it or displace or otherwise damage the dispensing device or any of its parts, or as the result, say, of a fire subjecting the fluid within the hose to a temperature such as to cause the fluid to ignite. In other words, a device 28, 46 is installed in the fluid conduit which shall interrupt the flow of fluid upon a rupture of the conduit or upon an increase of temperature to that above which the device is normally exposed.

In the modification illustrated in Figures 2, 3 and 4, a valve casing 28 is shown as connected as by a threaded connection with a nipple 27 to the outlet fitting 26. Obviously, the nipple 27 may represent the threaded end of any pipe, anywhere. This valve casing 28 is a two-part member in which a separable portion 30 is provided with a valve seat 32 and the passage for the fluid is adapted to be closed by a valve closure member 34 carried with a valve stem, one portion 36 of which extends upwardly from the closure 34 and is guided for reciprocation in a bearing member 38 carried, say, by a spider 40 mounted in the valve casing portion 28. The valve 34 is normally moved to its seat 32, in the illustrated embodiment, by a spring 42. Depending downwardly from the valve 34 in a direction opposite to that of the stem portion 36 is a valve stem portion 44. Preferably, the two portions 36 and 44 of the valve stem are in axial prolongation with one another and are disposed in the axis of the conduit, the downwardly depending valve stem portion 44 passing through the valve opening into a portion of the conduit formed by a supplemental tubular fitting 46 conveniently threaded into the end of the separable valve chamber portion 30. Obviously, the portions 28, 30 and 46 are illustrated as separable only from manufacturing considerations, although it is desirable to form the member 46 as a separable element so that it may be replaced if fractured. To the fitting 46 is secured the hose 24 in any convenient fashion, as by a coupling member 25.

As shown, this fitting 46 may be capable of fracture when a predetermined force is applied thereto or to the conduit in which it is inserted. Conveniently it may have a weakened portion. That is, the wall of the fitting may be relatively thin, as at a point 48, so that any pull on the hose or displacement of a pipe relative to the axis of the fitting greater than a predetermined one will cause a rupture of the fitting at the point 48. The supplemental fitting 46 is provided with means to retain a movable member in one position of its movement. As shown, there is mounted therein a bridge member 52, formed substantially, as shown, say, in Figure 7, of a strip of relatively light material, such as metal, having downwardly bent parallel flanges 54 on each side, for strength, but shorter turned up ends or tabs 56 which are shown in the embodiment of Figures 2 and 3 as passing through slots 58 in ears 60 extending, in a plane substantially transverse to the conduit, from an annular or tubular carrier member 62 secured within the supplemental fitting 46. As shown in Figure 2, this annular supporting member 62 is carried upon a shoulder 64, formed in the inner wall of the conduit portion 46. The upwardly extending ends or tabs 56 on the bridge member 52 may conveniently be secured to the ears 60 by a material 65, such as solder, fusible at a predetermined temperature. The carrier 62 and bridge member 52 are so disposed in the passage 47 as to be engaged by the valve stem 44 when the valve is in fully retracted position, the passage being thus open to the flow of fluid. Thus the normally movable member 44 is restrained. Obviously, the valve stem 44 may represent any movable element operative to perform some function, such as opening a switch, for instance, and the spring may represent any device in which power (kinetic or potential energy) may be stored to effect movement of a movable member to another position to accomplish a desired result.

In this, as well as in all subsequently described modifications comprising a carrier and a stop adapted either in whole or in part to conduct heat, it is desirable that the carrier be replaceable, but the same is inserted with a tight fit so as to have good contact with the wall of the conduit whereby heat may be readily exchanged from one part to the other. Although if the co-efficient of expansion of the parts 46 and 62 differs, the shoulder 64 will support the ring under normal conditions.

If, now, a strong pull is exerted on the hose 24, the conduit 46 will rupture at the point 48 and the two parts of the conduit 46 will separate at that point, thus permitting the bridge 52 and the parts to which it is secured to move or fall away from the valve casing and allow the spring 42 to force the valve 34 upon its seat 32, thus effectually closing the conduit to the flow of fluid and preventing any escape thereof below the break. Similarly, should the temperature of the atmosphere surrounding the conduit 46 be raised above that temperature at which the solder is fusible, the solder 65 will fuse and the force exerted on the bridge member 52 by the spring 42 through the instrumentality of the valve stem 44 will force the bridge member 52 away from its support 62, as shown in Figure 4, permitting the spring 42 to seat the valve 34 and close the conduit to the passage of fluid.

To facilitate the transfer of heat from the outside by the conduit portion 46, its wall is made of a good heat absorptive material and outwardly thereof is formed with a plurality of fins 66, conveniently circumferentially extending, thus offering an extended surface for heat absorption. Thereby is the temperature of the member 46 rapidly raised and the heat is conducted readily therethrough and to the carrier 62, the temperature of which is raised to the desired degree, whereby the solder 65, securing the tabs 56 to the ears 60, is fused, thereby releasing the bridge from the carrier and permitting it to be moved away from the carrier by the movable member 44 under the influence, conveniently, of expansible means such as the spring 42. Obviously, member 62 should also be of good heat conductive material.

In the modification illustrated in Figures 5, 6, 7 and 8, the conduit portion 46 is provided with a tubular carrier 68, not provided with the ears of the previous embodiment but the tabs on the bridge 52 are elongated, as shown at 70, and are substantially the same length as the axial dimension of the carrier 68 to which they are secured by a material such as solder 72, fusible at a predetermined temperature. The other elements of the device may be substantially as hereinbefore described and for any purpose and similar reference characters are affixed to corresponding parts in these figures. Here again, when the temperature of the member 46 is raised, heat is transmitted therethrough to the carrier 68, causing the solder, at least at one tab 70, to fuse, releasing the same so that the force of the spring causes the bridge to be bent downwardly as shown in dotted lines in Figure 6, or, where the solder on both tabs 70 is fused, the spring pressed stem 44 forces the bridge wholly away from the carrier 68 and allows it to drop downwardly into the passage, as shown in full lines.

In the same situations it may be found desirable to prevent the transfer of heat from the carrier to the fluid flowing through the conduit so that substantially all of the heat units conducted through the walls of the conduit will be utilized in the heating of the solder and not dissipated by conduction in the fluid. To this end, as shown in Figures 9 and 10, a carrier 68 has attached thereto a bridge member 52 having relatively short upstanding tabs 67 secured to the carrier by suitable adhesive 69 fusible at the required temperature. Surrounding the inner face of the wall of the conduit is a tubular shield 71 of some non-conductive or refractory material formed with diametrically opposite cut away parts or slots 73 so that the shield 71 may fit down over the bridge 52. The upper or inner extremities of the slots 73 merge into recesses 75 in the outer face of the shields and it is within these recesses that the tabs 67 and solder are disposed. The shield is conveniently positioned on the ledge formed by the upper end of the carrier 68 as by a downwardly facing shoulder 77 on the outer surface of the shield.

If now the conduit 46 is heated, the heat will be conducted rapidly therethrough to the annular carrier 68. This carrier may be made of any material of good heat conductivity such as copper. No heat is dissipated from the carrier into the fluid because of the shield 71. As the carrier is raised to a sufficient temperature, heat is transferred to the fusible material 69 which fuses and releases the bridge 52. The device then acts as explained in connection with previously described embodiments.

Due to the fact that fluid flowing through the conduit will carry away the heat conducted through the walls thereof very rapidly and thus, in some situations, preventing the effective operation of the responsive device shown, for instance, in Figure 10 but not in Figures 1 through 8, there may be provided, if found necessary, the construction illustrated in Figures 11 and 12, whereby the dissipation of the heat is prevented. Any movable member may be controlled. There is shown as an illustration, the valve member hereinbefore described in connection with Figures 2 and 10, and similar reference characters have been affixed to corresponding parts. As shown in Figure 11, a tubular responsive member 160 is formed with flanges 162, 163 by which, by means of coupling members 164, the tubular member 160 is secured to proximate conduit sections, say, on the one hand, by flange 162 to the separable member 30 and on the other hand by flange 163, say, to the hose coupling 25 of the hose 24. Wedged between the flange 163 and a nipple 166 which, of course, may represent the threaded end of any pipe and by which the coupling members 25 and 164 are connected, is a bridge member 154, 156 which may be identical with the bridge member 54, 56 hereinbefore described and which acts as a stop for a movable member 44. Disposed within the tubular responsive element 160 is a cylindrical element 168 formed preferably of a material non-conductive to heat or refractory. This non-conductive member 168 may, if desired, be spaced in part from the responsive element 160 as by having the midportion of a slightly smaller outside diameter than the interior diameter of the responsive member to define a space 170, and may be weakened at at least one point, several being shown at 172, whereby it may fracture when the responsive element 160 separates either by breaking or by fusing. In order that the responsive element may fracture, it is also weakened at at least one point, say, 174. In order to afford ample surface for the absorption of heat, the responsive element is also provided with a plurality of fins 176, as hereinbefore described. Here again, if a force greater than a predetermined maximum is exerted on the conduit, the responsive element 160 will fracture, as at 174, and the interior refractory cylinder will also fracture at one of the points 172, thus permitting the structure below the point of fracture to fall away carrying with it the bridge 156 to release the movable member 44. If, on the other hand, the temperature of the responsive device 160 is raised beyond a predetermined point, sufficient heat will be absorbed thereby to cause it to fuse. Since the heat cannot be dissipated by convexion in the fluid flowing through the conduit by reason of the non-conductive wall or shield 168 therebetween, the responsive element 160 will fuse, thus releasing the structure below the point of fusing and allow the spring to force the responsive element away and close the valve. A substantially similar device is illustrated in Figure 16, and corresponding reference numerals are applied to similar parts. In this instance, the responsive device 178, 180, while unitary, may be considered as formed of two portions 178, 180, the former being formed with the flange 162 and the latter with the flange 163, and these two portions 178 and 180 are defined by the weakened part 174 which unites them. Inwardly of the responsive part 178, 180, are disposed two tubular sections of non-conductive material indicated as 182 and 184, and their point of contact is substantially in the plane of the weak spot 174, so that when the portions 178 and 180 of the responsive member 178, 180 separate as from a fracture, the two non-conductive members 182 and 184 will separate on the same plane and readily permit the lower section of the valve to close. On an increase in temperature, if the responsive element 178, 180 fuses, the lower portion carrying the stop 154, 156 will fall away or separate by a push from the movable member 44 under the influence of the spring 42, as before, the two part refractory tubular shield 182, 184, readily permitting this separation.

Figure 13 shows still another modification of the invention, and, particularly, a modified stop as to the heat responsive element thereof. As shown, the tubular element 46 is interposed in the conduit to receive the end of the movable member 44 and this member may also be provided with fins 66 whereby a large surface for the absorption of heat is afforded. Carried inwardly of the element 46 and on the shoulder 64 is a bridge member 192 of heat conductive material and annular in shape, so as to contact with the wall of the member 46 all around and rapidly absorb heat therefrom. Extending diametrically across the passage 194 formed in the carrier 192 is a bridge 196 also of heat conductive material, and this bridge is apertured centrally, as at 198, to receive a closure shown as an inverted cup shaped heat responsive element 200 in heat exchanging relationship therewith and preferably of fusible material, upon the top of which the movable member 44 rests. Now when the tubular conduit member 46 is subjected to heat, the heat is conducted readily through the member 46 and to the heat conductive carrier 192 and to and through the bridge 196 to the fusible element 200, and when the temperature of the bridge 196 is raised to a predetermined temperature, the fusible element 200 fuses, permitting power means to force the movable member 44 downwardly because the molten material of the element 200 offers no obstruction to the movement of the member 44, and thus the valve may be closed or other movement effected, and if the conduit portion is fractured, as described, for instance, in connection with the embodiment of Figure 2, the device will operate as does the embodiment of Figure 2.

It will thus be seen that a safety valve or cutout valve or fire hazard valve has been provided which involves an element responsive either to force or heat or both and in either event permitting one element to move relative to another element to permit the actuation of a movable member as, for instance, to release a closure member, which movable member closes an orifice through which fluid normally passes or may perform some other movement. The heat conductive material and/or the fusible material may be so selected as not to respond to the normal temperatures, such as sunlight, to which the device is exposed but will respond to temperatures thereabove, and, similarly, the strength of the material may be selected such as to withstand the strains normally imposed thereon. It will be further observed that the responsive element, whether the bridge piece and carrier of Figures 2, 3, 4, 5, 6, 7, 8, 9, 10, 13, or a member capable of fracturing, are all readily removable and replaceable so that the same movable member may be reused and only the member or solder subject to destruction need be replaced.

While the invention has been described as responsive in some situations to a rise in temperature, it will be apparent that, in its broadest aspects, it is within the purview of the invention to provide a device responsive to a drop in temperature to control or restrain the movement of a given element.

Various modifications will occur to those skilled in the art in the composition, configuration and disposition of the component elements going to make up the invention as a whole as well as in the selection and combination of the individual elements hereinbefore described, and their use to perform a desired function, and no limitation is intended by the phraseology of the foregoing description or illustrations in the accompanying drawings, except as indicated in the appended claims.

What is claimed is:—

1. In a device of the character described, in combination, a valve having a valve casing, a valve stem extending into a conduit portion associated with said valve casting, a seat therefor, a spring normally urging the valve on its seat, restraining means disposed within the conduit portion and engaged by the valve stem in valve open position comprising at least one portion fusible at a predetermined temperature and separate means within the conduit portion having high heat conductivity to conduct heat from the conduit portion to the restraining means.

2. In a device of the character described, the combination with a conduit, of a valve casing insertable therein comprising a valve having a valve stem extending without the casing and a seat therefor, a spring normally urging the valve to its seat, a tubular conduit portion of heat conductive material into which the valve stem extends, said conduit portion being provided outwardly thereof with fins of conductive material, a tubular carrier of heat conductive material in heat conducting relation with and carried by the conduit portion therewith, a bridge member adapted to be secured to the carrier and to be engaged by the valve stem in valve open position, the coacting surface of said carrier and bridge being adhesive to a fusible material and a material therebetween fusible at a predetermined temperature.

3. In a device of the character described, the combination with a conduit, of a valve casing insertable therein comprising a valve having a valve stem extending without the casing and a seat therefor, a spring normally urging the valve to its seat, a tubular conduit portion of heat conductive material into which the valve stem extends, a tubular carrier of heat conductive material in heat conducting relation with and carried by the conduit portion therewithin, a bridge member adapted to be secured to the carrier and to be engaged by the valve stem in valve open position, the coacting surface of said carrier and bridge being adhesive to a fusible material and a material therebetween fusible at a predetermined temperature.

4. In a device of the character described, the combination with a conduit, of a valve casing insertable therein comprising a valve having a valve stem extending without the casing and a seat therefor, a spring normally urging the valve to its seat, a tubular conduit portion of heat conductive material into which the valve stem extends, a tubular carrier of heat conductive material in heat conducting relation with and carried by the conduit portion therewithin and means comprising at least a fusible element adapted to be secured to the carrier and to be engaged by the valve stem in valve open position.

5. In a device of the character described, the combination with a conduit, of a valve casing insertable therein comprising a valve having a valve stem extending without the casing and a seat therefor, a spring normally urging the valve to its seat, a tubular conduit portion of heat conductive material into which the valve stem extends, said conduit portion being provided outwardly thereof with fins of heat conductive material, a stop carried with an end of the conduit portion remote from the valve and engaged by the valve stem in valve open position, the coacting surfaces of said stop and conduit being adhesive to a fusible material, a material therebetween fusible at a predetermined temperature and a tubular shield of refractory material within the tubular conduit portion and serving to conduit the fluid flowing therethrough out of contact with the tubular conduit portion.

6. In a device of the character described, the combination with a conduit, of a valve casing insertable therein comprising a valve having a valve stem extending without the casing and a seat therefor, a spring normally urging the valve to its seat, a tubular conduit portion of heat conductive material into which the valve stem extends, a stop carried with an end of the conduit portion remote from the valve and engaged by the valve stem in valve open position, said stop comprising at least a portion of fusible material adherent to said conduit portion and a tubular shield of refractory material within the tubular conduit portion and serving to conduct the fluid flowing therethrough out of contact with the tubular conduit portion.

7. The combination with a conduit having a movable member therein, of a conduit portion of heat conductive material, fins thereon, a heat carrier therewithin and in heat exchanging relationship therewith, a bridge carried with the carrier and formed with a passage for the movable member and a closure for the passage in heat exchanging relationship with the bridge and of a material, fusible at a predetermined temperature and engaged by the movable member.

8. In a device of the character described, the combination with a conduit, a movable element normally tending to move in one direction and having at least a portion disposed within the conduit, an annular carrier of heat conductive material carried with the inner surface of the conduit, an abutment member normally restraining movement of said element, a solder fusible at a predetermined temperature securing the abutment member to the carrier and an annular shield insulating the carrier and solder from the contents of the conduit.

9. In a device of the character described, the combination with a conduit, a movable element normally tending to move in one direction and having at least a portion disposed within the conduit, an annular carrier of heat conductive material carried with the inner surface of the conduit, an abutment member normally restraining movement of said element, a solder fusible at a predetermined temperature securing the abutment member to the carrier and an annular shield of heat insulating material insulating the carrier and solder from the contents of the conduit.

10. In a device of the character described, the combination with a conduit, a movable element normally tending to move in one direction and having at least a portion disposed within the conduit, an annular carrier of heat conductive material carried with the inner surface of the conduit, a bridge member normally restraining movement of said element formed with upstanding tabs, a solder fusible at a predetermined temperature securing the tabs to the carrier and an annular shield of heat insulating material formed with cut-away portions to receive the tabs, respectively, and insulating the carrier and solder from the contents of the conduit.

11. In a device of the character described, the combination with a conduit, of a valve casing portion insertable therein having a valve seat, a valve in the valve casing portion having a valve stem whereof an end extends without the valve casing portion, a spring normally urging the valve to its seat, a conduit portion into which said end of the valve stem extends and whereof the wall is offset, and an abutment member supported at at least two points lying in angularly related radial planes respectively from the offset and engaged by said valve stem end in valve open position and comprising material fusible at a predetermined temperature.

12. In a device of the character described, the combination with a conduit, of a valve casing portion insertable therein having a valve seat, a valve in the valve casing portion having a valve stem whereof an end extends without the valve casing portion, a spring normally urging the valve to its seat, a conduit portion into which said end of the valve stem extends and provided with a shoulder, an abutment member supported from the shoulder and engaged by said valve stem end in valve open position and comprising material fusible at a predetermined temperature and separate means having high heat conductivity to conduct heat from the conduit portion to the fusible material.

13. In a device of the character described, the combination with a conduit, of a valve casing portion insertable therein having a valve seat, a valve in the valve casing portion having a valve stem whereof an end extends without the valve casing portion, a spring normally urging the valve to its seat, a conduit portion into which said end of the valve stem extends and provided with a shoulder, an abutment member supported from the shoulder and engaged by said valve stem end in valve open position and comprising material fusible at a predetermined temperature and means to conduct heat from the conduit portion to the fusible material and a tubular shield of refractory material within the conduit portion and serving to conduct fluid flowing therethrough out of contact with the area of the inner surface of the conduit portion adjacent the fusible material.

14. In a device of the character described, the combination with a conduit, of a valve casing portion insertable therein having a valve seat, a valve in the valve casing portion having a valve stem whereof an end extends without the valve casing portion, a spring normally urging the valve to its seat, a conduit portion into which said end of the valve stem extends and provided with a shoulder, an abutment member comprising fusible material supported from the shoulder and engaged by said valve stem end in valve open position and a tubular shield of refractory material within the conduit portion and serving to conduct fluid flowing therethrough out of contact with a predetermined area of the inner surface of the conduit portion.

15. In a device of the character described, the combination with a conduit, of a valve casing portion insertable therein having a valve seat, a valve in the valve casing portion having a valve stem whereof an end extends without the valve casing portion, a spring normally urging the valve to its seat, a conduit portion into which said end of the valve stem extends and provided with a shoulder, and an abutment member supported from the shoulder at at least two points lying in angularly related radial planes respectively and engaged by said valve stem end in valve open position and comprising material fusible at a predetermined temperature, said fusible material being so disposed as to receive heat from the wall of the conduit portion at at least two points in angularly related radial planes.

16. In a device of the character described, the combination with a conduit, of a valve casing portion insertable therein having a valve seat, a valve in the valve casing portion having a valve stem whereof an end extends without the valve casing portion, a spring normally urging the valve to its seat, a conduit portion into which said end of the valve stem extends and provided with a shoulder, an abutment member supported from the shoulder and engaged by said valve stem end in valve open position and comprising material fusible at a predetermined temperature, said fusible material being so disposed as to receive heat from the wall of the conduit portion at at least two points, and a tubular shield of refractory material within the conduit portion and serving to conduct fluid flowing therethrough out of contact with the area of the inner surface of the conduit portion adjacent the fusible material.

17. In a device of the character described, the combination with a conduit, of a valve casing portion insertable therein having a valve seat, a valve in the valve casing portion having a valve stem whereof an end extends without the valve casing portion, a spring normally urging the valve to its seat, a destructible conduit portion into which said end of the valve stem extends and provided with a shoulder, an abutment member comprising fusible material supported from the shoulder and engaged by said valve stem end in valve open position and a tubular shield of refractory material within the conduit portion and serving to conduct fluid flowing therethrough out of contact with a predetermined area of the inner surface of the conduit portion.

18. In a device of the character described, in combination, a conduit portion conductive to heat, a valve casing connected to the conduit portion, a valve having a valve stem, a seat for the valve, a spring normally urging the valve on its seat, restraining means carried with the conduit portion and engaged by the valve stem in valve open position comprising at least one portion fusible at a predetermined temperature and a separate portion within the conduit portion having high heat conductivity to conduct heat from the conduit portion to the fusible portion.

19. In a device of the character described, the combination with a conduit, of a valve casing portion insertable therein having a valve seat, a valve in the valve casing portion having a valve stem whereof an end extends without the valve casing portion, a spring normally urging the valve to its seat, a conduit member into which said end of the valve stem extends and whereof the wall is offset, and a fusible abutment member supported at at least two points lying in angularly related radial planes respectively and engaged by said valve stem end in valve open position, whereby the stem is releasable from valve open position upon destruction of one of said supporting points.

20. A safety device of the character described comprising a valve casing having a valve seat in the fluidway, a valve normally tending to move into engagement with said seat, restraining means for the valve engaging the valve and holding it in valve open position, comprising at least a portion in close proximity to the casing wall and within the fluidway and fusible at a predetermined temperature and separate means within the fluidway having relatively high heat conductivity to conduct heat from the casing wall to the restraining portions.

21. A safety device of the character described comprising a valve casing having a valve seat in the fluidway, a valve normally tending to move into engagement with said seat, a separate carrier of heat conductive material in heat conducting contacting relation with and carried by the casing wall within the fluidway, a bridge member adapted to be secured to the carrier proximate a portion thereof in contact with the casing wall and engaging the valve and holding it in valve open position, the coacting surface of said carrier and bridge being adhesive to a fusible material and a material therebetween fusible at a predetermined temperature.

22. A safety device of the character described comprising a valve casing having a valve seat, a valve normally tending to move into engagement with said seat, restraining means for the valve engaging the valve and holding it in valve open position, comprising at least a portion in contact with the casing wall fusible at a predetermined temperature and separate shielding means to conduct fluid flowing through the casing out of contact with the casing wall proximate the fusible portion of the restraining means.

BJORNULF JOHNSEN.